Dec. 16, 1941. T. F. PETERSON Re. 21,979
HEATING DEVICE
Original Filed Dec. 9, 1937 2 Sheets-Sheet 1
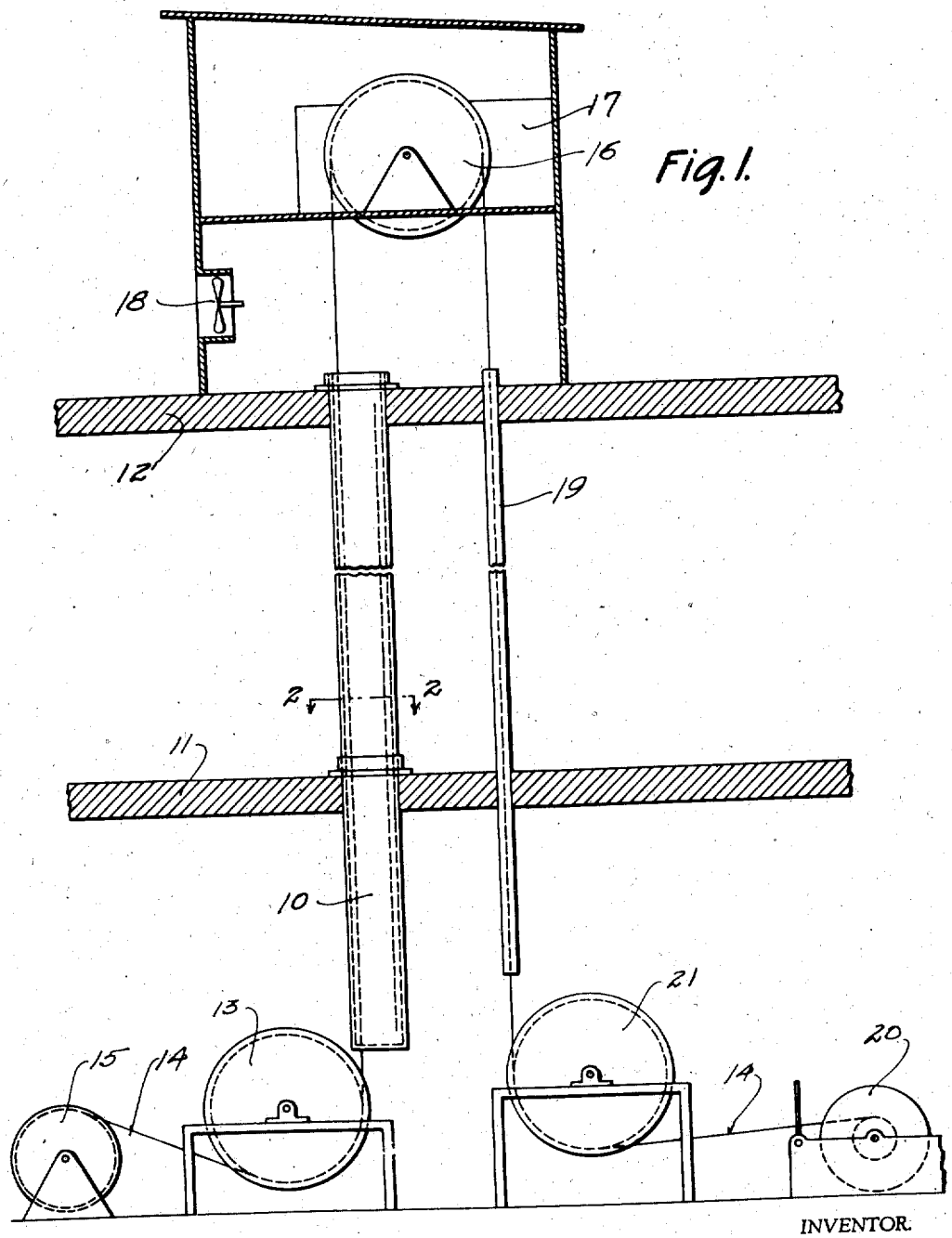
INVENTOR.
Thomas F. Peterson
BY Jno. H. Nielsen
ATTORNEY.

Dec. 16, 1941. T. F. PETERSON Re. 21,979

HEATING DEVICE

Original Filed Dec. 9, 1937 2 Sheets-Sheet 2

INVENTOR.
Thomas F. Peterson
BY Jos. A. Nielsen
ATTORNEY.

Reissued Dec. 16, 1941 Re. 21,979

UNITED STATES PATENT OFFICE 21,979

HEATING DEVICE

Thomas F. Peterson, Worcester, Mass.

Original No. 2,156,352, dated May 2, 1939, Serial No. 178,876, December 9, 1937. Application for reissue February 10, 1940, Serial No. 318,377

8 Claims. (Cl. 13—20)

This invention relates to heaters and methods of heating, more particularly designed for the baking or heating of longitudinal elements as wires, rods, cables or the like. The customary practice for treating such elements is to wind them on reels or in coils and place them in an oven, as for example in the annealing of wire, curing rubber-coated elements, drying cable, etc. Sometimes the elements are passed through chambers heated by gas, oil, coal, hot air or steam. When the elements are of metal, induction heating or resistance heating by the passage of an electric current may be used. All these methods, however, are objectionable either from the lack of efficiency or the lack of uniformity in the heat treatment.

The present invention provides a method of radiant heating or treating with other forms of radiant energy exteriorly, and apparatus therefor, that operates with efficiency and uniformity. It furthermore provides for exact control of the change or reaction caused by the radiant energy. Moreover, by heating or applying radiant energy exteriorly under closely controlled conditions in accordance with this invention, it is found that the amount of heating or radiant energy required for baking, vulcanizing and other similar operations involving a physical or chemical change, e. g. a heat-reaction, in the surface or in the surfacing material on the element being treated, can be applied without unduly creating changes such as raising the temperature of the interior. For instance in some forms of rubber-jacketed cable, insulation is present in the interior of the cable that deteriorates if exposed to the temperature required for rubber vulcanization; the present invention permits the manufacture of such cable without injury to the heat-sensitive interior insulation. Similarly in the baking of enamel coatings it is at times desirable that a relatively high temperature be employed for obtaining a hard resistant coating without creating objectionable changes in plasticity or other properties of insulation under the coating.

In general the objects of the present invention are accomplished by the condensation of reflected heat or other radiant energy waves, in place of or in conjunction with other forms of energy, upon the element being treated. A practical embodiment is that of a closed cylindrical oven with an interior reflecting surface and having a focal region within which the reflected energy waves such as heat waves can be condensed; the wire, cable or other longitudinal element is positioned or moved through the focal region. As an instance the embodiment (hereinafter more fully described) can be that of a cylinder of elliptical right section with the element to be treated extending through the locus of one of the foci of the ellipse; in this case the source of the energy, such as an electric resistance wire, can be positioned along the locus of the conjugate focus.

There are practical limitations imposed on structural embodiments of the invention. To be operative in a commercial sense it is essential that a major part at least of the emitted energy be concentrated or condensed within a focal area or region corresponding to and not much less than a cross-section of the element being treated, and vice versa that the element being treated have a cross-section approximating or exceeding the focal area into which the waves are condensed in order to intercept to a useful extent the radiant energy; otherwise the variableness in wave propagation, wastage of energy and consequent cost of operation nullify the advantages to be had over direct energy application. Practically concentration of energy along the locus of a focal area of negligible cross-section or approximating a line has not been found feasible and most of the energy is absorbed by the walls after repeated reflections; and by the same token an element to be treated of negligible diameter or cross-section is apt to be either highly over-treated or under-treated depending upon such fortuitous circumstances as the direction of wave emission at a particular instant, cross interception of reflected waves at the element, relative cross-sectional areas of the emitting device and the wall, accuracy of construction, permissible waste, etc., all of which have their modifying effects because of these many factors the minimum focal area or cross-section of the material treated cannot be expressed by any formula or in any definite terms. It may be stated, however, that elements of the sizes and material of textile threads are not within the category of elements contemplated for treatment in accordance with this invention or found amenable in practice to such treatment. Elements to which the present invention is applicable are wires, rods, cables and built-up structures sufficient in cross-section to subtend the major part at least of the waves condensed at the focal area and furthermore of a nature or material that involves some alteration in a physical or chemical sense and that is capable of subjection to the action of the radiant waves when concentrated without objectionably injurious effect. In the absence of any means of measurement or classification as to material the elements to which this invention apply are defined as of appreciable cross-section and of materials susceptible to radiant energy reaction.

In the accompanying drawings:

Fig. 1 is an elevation of an assembly illustrating an embodiment of the present invention;

Figure 3:
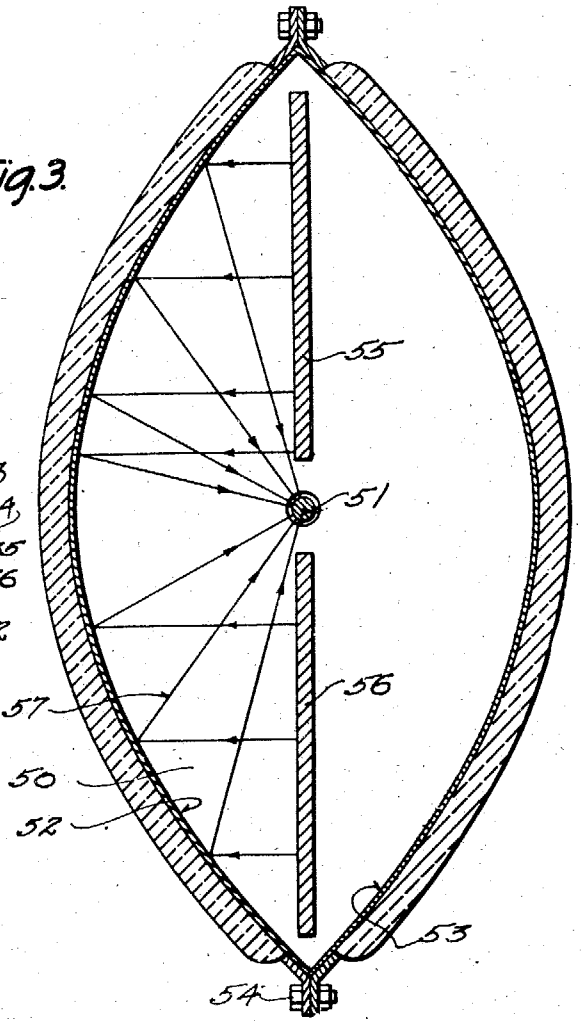
Fig. 3 illustrates another form of right section for the heater.

The heater or oven 10 is illustrated as a vertical tower or cylinder suitably supported from the floors 11 and 12; the length of the tower can be varied within wide limits depending upon the time required for heating and the speed with which the element to be heated is drawn through the tower. At the lower-end of the tower a guiding sheave 13 or other suitable means is placed to properly position the element 14, such as wire to be annealed or baked, as it is drawn from the reel 15. At the upper end of the tower there is mounted a second guiding sheave 16 which can be operated from a motor and suitable transmission gearing in housing 17 for drawing the wire through the heating tower. Before passing over the driving sheave 16 it may be desirable to cool the wire as it comes from the heating tower by means of a current of air created by a fan 18. Or as the wire leaves the driving sheave, it can be passed downwardly through a cooling tower 19 before being drawn onto the spool 20 over the guiding sheave 21. These parts are of course subject to change and substitution, depending upon the use made of the tower; for instance when wire is to be coated and then baked, the sheave 13 can be placed in a tank or tray containing the coating material to guide and submerge the wire in the coating material. As another instance the cooling tower 19 can be built similarly to the heating tower 10 whereby the heat given off by the wire on cooling can be utilized as a preliminary heating means for another wire or a different portion of the same wire.

Figure 2:
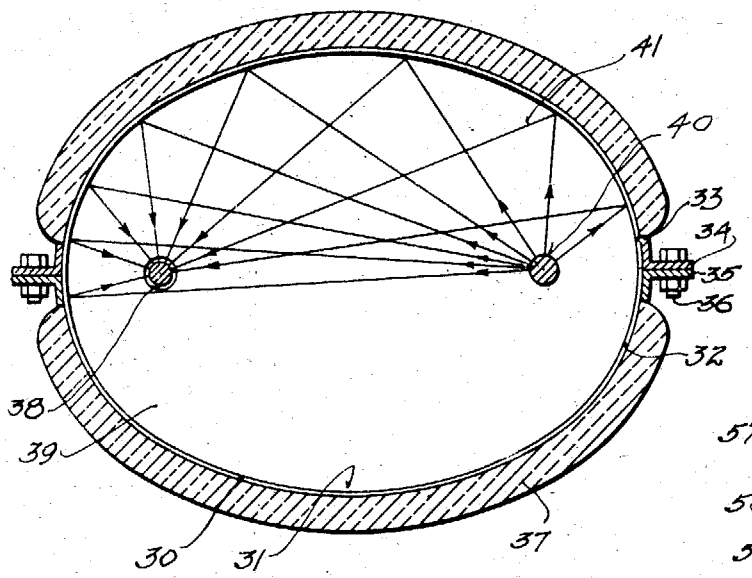
Fig. 2 illustrates an enlarged right section on the line 2—2 of Fig. 1.

The heating tower as illustrated in Fig. 2 has as its right section an ellipse. The metal wall 30 is provided with an interior reflecting surface 31. The metal wall can be made in sections 32, 33 with angles 34, 35 welded thereto and bolted together by bolts 36. An insulating jacket 37 of asbestos or the like is placed about the exterior of the tower.

The tower can be open at both the top and bottom but preferably these ends are closed in order to give a more effective regulation and permit operations under pressure if desired. When so closed at both ends the tower can be ventilated by providing suitable inlets and outlets for the circulation of a gaseous medium; when a coating is being baked, the solvent vapors drawn through an outlet can be suitably condensed.

The element or wire 14 to be heat-treated is passed through a bushing 38 in the base 39 when the tower is closed. The bushing is located at a focus of the elliptical cross-section. There can be a similar bushing located at the focus at the upper end, and if found necessary additional guides of porcelain or the like along the length of the tower can be provided. The purpose is to maintain the wire or element being treated within the focal region in which the radiant waves are condensed. The bushings in the closed ends of the tower can be of refractory material as porcelain or the like; and the bushings can be longitudinally extended from the ends of the tower to give a gradual cooling of the moving element as it leaves by the transfer of heat along the bushing.

At the other focus 40 there is mounted a heating element. This can conveniently be an electrical resistance element in the form of a rod with suitable connections for current, or it may be a gas-fired hollow tube. The heat rays thrown off by the heating element 40 strike the reflecting inner surface of the tower as shown by the lines 41 and are reflected within the focal area 38.

In Fig. 3 there is illustrated in cross-section another embodiment. In this form the right section 50 is parabolic with the wire to be treated at the focus 51. To provide a closed tower two parabolic walls 52 and 53 secured together by bolts 54 are provided and having the common focus 51. Heat is provided by plates 55, 56 placed perpendicularly to the axis of the parabola and on a line through the focus; the parallel heat rays 57 are thereby reflected back of the wall and condensed within the focal region 51. The plates may be any convenient form of heating means, for instance, they can be built up of strip or grid electrical heaters and if desired the strips or grids can be mounted in a matrix of refractory material; or the heating means can be gas-fired plates and for this purpose can be made hollow. The plates are suitably supported in the tower.

The embodiment of Fig. 3 need not necessarily comprise two parabolic walls as shown. One can be omitted and a heating plate used as a part of the cylindrical wall; in this case, the heating plate is preferably placed a distance beyond the focal line such as to equalize as nearly as possible the heating effect on all sides of the element being treated.

The operation of the heating device is believed obvious from the foregoing description. The wire, cable or other longitudinal element to be annealed, baked, vulcanized or otherwise heat-treated is maintained in the focal area of the cylindrical tower as determined by the right section of the tower within which the waves are condensed. The element is drawn through the tower at a rate of speed depending upon the time period of heating, the degree of heat condensed upon the element and the height of the tower. Evidently these factors can be accurately controlled to give just the amount of heating necessary for each particular operation. Because of the controlled heating so obtained it has been found possible to vulcanize a rubber jacket or covering over a heat-sensitive insulation without injury to the insulation.

The tower is primarily intended for the heating of continuous elements as wire and the like to be drawn through the tower. It is possible, of course, to support an element in a stationary position along the locus of a focus and flash on the heat for a length of time necessary to secure the effect desired. The element after treatment is then dismounted.

What is claimed is:

1. A heating device comprising in combination a cylindrical tower having a right section of a curvature providing a focal area and having an interior reflective surface, said tower being provided with closed ends, means associated with the tower for maintaining a material to be heat-treated along the focal region of the tower, said supporting means permitting movement of the material along the tower, refractory bushings mounted in the ends of the tower and along the focal region of the tower for permitting movement of the material while substantially sealing the interior of the tower to render the tower capable of operation under pressure or in the presence of an inert atmosphere, and heating means having its heating surface positioned in the tower so that heat waves radiating therefrom are reflected from the reflective surface and condensed upon the focal region of the tower.

2. Radiant energy transmitting device for causing changes in materials comprising in combination a tower having a wall with a right section of a curvature providing a focal area and with a straight line generatrix, said wall having a reflecting surface to substantially condense radiated energy waves within the focal region of the wall upon a material when of a cross-section substantially corresponding to or greater than the focal area and extending longitudinally of the focal region of the tower, and a source of energy positioned in the tower so that energy waves radiated therefrom are reflected by the reflecting surface and condensed upon the focal region of the tower, said energy source being constituted by an element extending in parallelism to the wall generatrix and of a size emitting sufficient energy to cause the desired change in the material treated.

3. Radiant energy transmitting device for causing changes in materials comprising in combination a tower having a wall with a right section corresponding to a parabola providing a focal area and with a straight line generatrix, said wall having a reflecting surface to substantially condense radiated energy waves within the focal region of the wall upon a material when of a cross-section substantially corresponding to or greater than the focal area and extending longitudinally of the focal region of the tower, and a source of energy positioned in the tower so that energy waves radiated therefrom are reflected by the reflecting surface and condensed upon the focal region of the tower, said energy source being constituted by an element extending in parallelism to the wall generatrix and of a size emitting sufficient energy to cause the desired change in the material treated.

4. Radiant energy transmitting device for causing changes in materials comprising in combination a tower having a wall with a right section corresponding to an ellipse providing a focal area and with a straight line generatrix, said wall having a reflecting surface to substantially condense radiated energy waves within the focal region of the wall upon a material when of a cross-section substantially corresponding to or greater than the focal area and extending longitudinally of the focal region of the tower, and a source of energy positioned in the tower so that energy waves radiated therefrom are reflected by the reflecting surface and condensed upon the focal region of the tower, said energy source being constituted by an element extending in parallelism to the wall generatrix and of a size emitting sufficient energy to cause the desired change in the material treated.

5. Radiant energy transmitting device for causing changes in materials comprising in combination a tower constituted by longitudinally extending walls parabolic in cross-section with a common focal region and having a reflecting surface to substantially condense radiated energy waves within the focal region, and a source of radiant energy positioned within the tower so that energy waves radiated therefrom are reflected by the reflecting surface and condensed upon the focal region of the tower.

6. Heating device for causing changes in materials comprising in combination a tower constituted by longitudinally extending walls parabolic in cross-section with a common focal region and having a reflecting surface to substantially condense radiated energy waves within the focal region, and a source of radiant heat energy positioned within the tower so that energy waves radiated therefrom are reflected by the reflecting surface and condensed upon the focal region of the tower.

7. Process of imparting energy by radiation for causing changes in materials which comprises providing a longitudinally extending reflecting surface having a focal region and imposing on the reflecting surface energy waves emanating from a radiating source for condensation upon a material of a cross-section substantially corresponding to or greater than the focal area and extending longitudinally of the focal region.

8. Process of heating by radiation for causing changes in materials which comprises providing a longitudinally extending reflecting surface having a focal region and imposing on the reflecting surface heat waves emanating from a heat radiating source for condensation upon a material of a cross-section substantially corresponding to or greater than the focal area and extending longitudinally of the focal region.

THOMAS F. PETERSON.